United States Patent [19]

Chmielewski

[11] Patent Number: 4,888,957
[45] Date of Patent: Dec. 26, 1989

[54] SYSTEM AND METHOD FOR REFRIGERATION AND HEATING

[75] Inventor: Konrad G. Chmielewski, Fort Smith, Ark.

[73] Assignee: Rheem Manufacturing Company, New York, N.Y.

[21] Appl. No.: 777,323

[22] Filed: Sep. 18, 1985

[51] Int. Cl.$^4$ .................................... F25B 31/00
[52] U.S. Cl. ......................... 62/84; 62/192; 62/212
[58] Field of Search .............. 62/192, 193, 197, 208, 62/212, 222, 224, 225; 417/18

[56] References Cited

U.S. PATENT DOCUMENTS

| | | | |
|---|---|---|---|
| 3,411,313 | 11/1968 | Brown et al. | 417/18 |
| 3,488,975 | 1/1970 | Nelson | 62/212 |
| 3,820,350 | 6/1974 | Brandin et al. | 62/193 |
| 4,067,203 | 1/1978 | Behr | 62/208 |
| 4,090,371 | 5/1978 | Keane | 62/193 X |
| 4,236,379 | 12/1980 | Mueller | 62/193 X |
| 4,244,182 | 1/1981 | Behr | 62/211 |
| 4,381,650 | 5/1983 | Mount | 62/193 X |
| 4,399,663 | 8/1983 | Hesler | 62/193 |
| 4,404,811 | 9/1983 | Mount et al. | 62/193 X |
| 4,404,812 | 9/1983 | Zirsmeyer | 62/193 X |
| 4,419,865 | 12/1983 | Szymaszek | 62/193 |
| 4,448,038 | 5/1984 | Barbier | 62/212 |
| 4,503,683 | 3/1985 | DiCarlo et al. | 62/193 |
| 4,527,399 | 7/1985 | Lord | 62/225 X |
| 4,545,212 | 10/1985 | Noda | 62/225 X |

FOREIGN PATENT DOCUMENTS 17509 2/1979 Japan .................................... 417/18

Primary Examiner—William E. Wayner
Attorney, Agent, or Firm—Robin, Blecker, Daley & Driscoll

[57] ABSTRACT

A system for refrigeration comprises: a compressor having an inlet, an oil sump, and an outlet; a condenser having an outlet, and an inlet connected to the compressor outlet; an expansion valve operable for controlling refrigerant flow in the system and having an outlet, and an inlet connected to the condenser outlet; an evaporator having an inlet connected to the expansion valve outlet and an outlet connected to the compressor inlet; and a control unit for operating the expansion valve to maintain a predetermined temperature differential between the temperature of oil in the oil sump and the saturated temperature of the refrigerant in the vicinity of the compressor inlet. The temperature differential is selected such that refrigerant in liquid phase in the compressor does not excessively dilute the compressor oil.

17 Claims, 4 Drawing Sheets

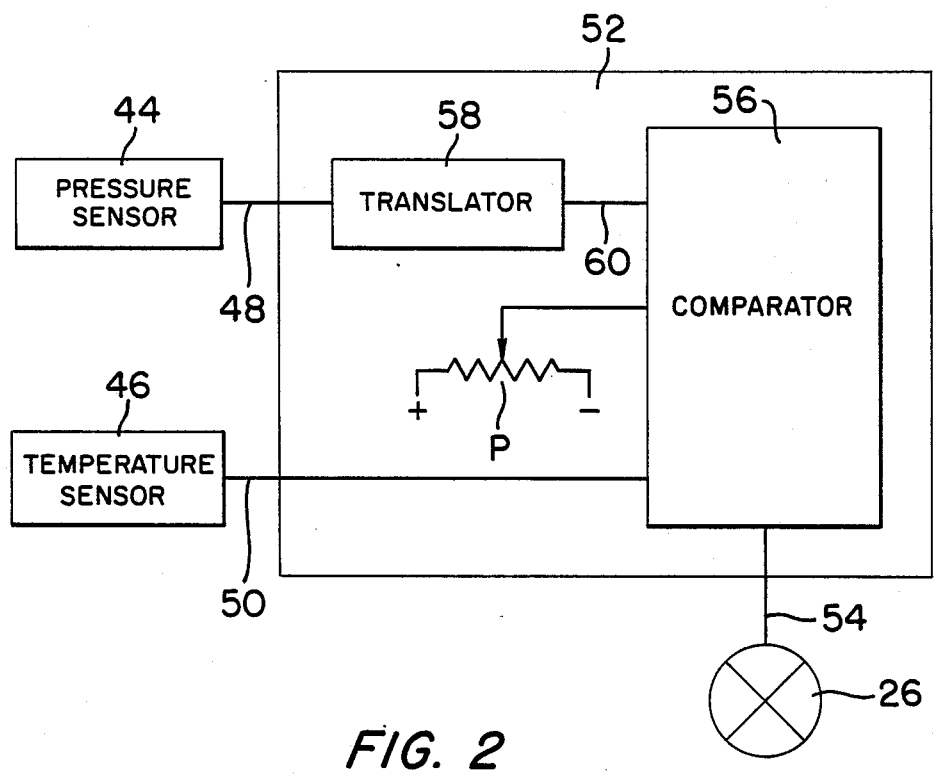
FIG. 2
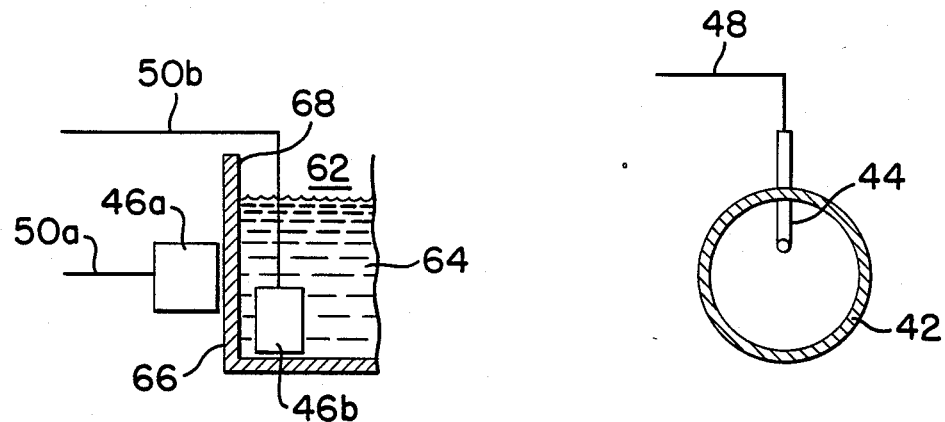
FIG. 3
FIG. 4

SYSTEM AND METHOD FOR REFRIGERATION AND HEATING

FIELD OF THE INVENTION

This invention relates to improved mechanical compression type refrigeration and heating systems and methods.

BACKGROUND OF THE INVENTION

Widely known and used mechanical compression type refrigeration systems typically employ a fluid refrigerant medium and direct same into various phases or states to attain the needed successive heat exchange functions. Generally, such systems employ a compressor which admits at its inlet refrigerant issuing from an evaporator at or above saturated vapor state, i.e., vapor at or above boiling temperature corresponding to evaporation temperature. The compressor compresses admitted refrigerant to higher pressure and issues high pressure refrigerant vapor at superheated condition, i.e., in state having temperature higher than the refrigerant boiling temperature at that pressure.

Such superheated refrigerant vapor is conducted from the compressor to a heat exchanger, called a condenser, of type in which a cooling medium comes into indirect contact with the incoming vapor, removing latent heat from the refrigerant and issuing liquid refrigerant, i.e., refrigerant in liquid state, at or below boiling temperature corresponding to condensing pressure.

Refrigerant thus issuing from the condenser is conducted through an expansion valve which effects a controlled reduction in the pressure and hence temperature of the refrigerant. A flashing into vapor of a portion of the liquid refrigerant occurs, resulting in issuance from the valve of a low temperature liquid refrigerant with a small vapor fraction.

The refrigerant, in state issuing from the expansion valve is conducted to a second heat exchanger, wherein the refrigerant is evaporated by heat transferred thereto by the ambient environment to be cooled. This heat exchanger, called an evaporator, issues refrigerant in vapor state, i.e., refrigerant vapor at or above boiling temperature corresponding to the saturated evaporation pressure. The evaporator output is conducted to the compressor inlet for continuous cycling of the described practice.

In this described state of the art practice, the expansion valve is operated such that system flow rate is controlled to insure admission to the compressor of refrigerant in non-liquidous state. Such practice accommodates oil-lubricated compressors, which involve an oil sump in which lubricating properties of the contained oil become degraded as dilution with refrigerant increases.

Various efforts addressed to the insurance of liquid-free refrigerant at the compressor inlet are known and addressed in patents to be made of record herein.

In applicant's view, advantage attends the presence of some liquidous refrigerant in the compressor inlet medium, if same is not permitted to excessively dilute compressor oil. Since the prior art efforts have addressed the presence of liquid in the compression phase as intolerable, same have been unduly constrained in results.

SUMMARY OF THE INVENTION

The present invention has as a primary object the provision of improved methods and systems for mechanical compression type refrigeration and/or heating.

A more particular object of the invention resides in the controlled admission to a compressor of such compression type refrigeration and/or heating systems of refrigerant in liquid phase.

In efficiently attaining the foregoing and other objects, the invention at hand provides a system for refrigeration comprising: a compressor having an inlet, an oil sump, and an outlet; a condenser having an outlet, and an inlet connected to the compressor outlet; an expansion valve operable for controlling refrigerant flow in the system and having an outlet, and an inlet connected to the condenser outlet; an evaporator having an inlet connected to the expansion valve outlet and an outlet connected to the compressor inlet; and a control unit for operating the expansion valve to maintain a predetermined relationship between the temperature of oil in the oil sump and saturated temperature of the refrigerant in the vicinity of the compressor inlet. The relationship effects a minimum temperature differential selected such that solubility of the refrigerant, entering the compressor, with the compressor oil is limited over that which would otherwise occur.

In a particularly preferred embodiment, the system of the invention arranges its control unit to include a first sensor for generating an output signal indicative of the temperature of the oil in the oil sump and a second sensor for generating an output signal indicative of the pressure of refrigerant in the vicinity of the compressor inlet. The second sensor output signal is applied to a translator, which relates same to temperature. A comparator device receives the output signals of the first sensor and the translator and compares same for operating the expansion valve.

The invention also provides a method for effecting mechanical compression type refrigeration comprising the steps of: providing a refrigerant; compressing same by a compression unit to provide a superheated vapor therefrom; removing latent heat from the superheated vapor to provide a saturated liquid state thereof; conducting the refrigerant in such saturated liquid state to an expansion valve and issuing therefrom refrigerant in liquid state with a vapor fraction; exposing the refrigerant in such liquid state with a vapor fraction to an environment to be refrigerated, thereby evaporating the refrigerant only in part and retaining same in liquid part; conducting the refrigerant with such liquid part to the compression unit; and operating the expansion valve in manner maintaining a predetermined temperature differential between the refrigerant and the compressor oil sump to avert excessive dilution of the oil by the refrigerant, i.e., dilution greater than a predetermined dilution.

The foregoing and other objects and features of the invention will be further understood from the following detailed description of systems and methods thereof and from the drawings wherein like reference numerals identify like parts and components throughout.

DESCRIPTION OF THE DRAWINGS

FIG. 2 is a functional block diagram of the control unit of the system of FIG. 1.

FIG. 3 is a partial sectional view of a compressor shell casing of the FIG. 1 system, illustrating two options for disposition of the temperature sensor of the FIG. 1 system for detecting the temperature of the oil in the compressor oil sump.

FIG. 4 is a sectional view of a conduit extending between the evaporator and compressor of the system of FIG. 1 with the pressure sensor of the system either in the compressor or exteriorly thereof in such conduit.

DETAILED DESCRIPTION OF PREFERRED EMBODIMENTS AND PRACTICES

Figure 1:
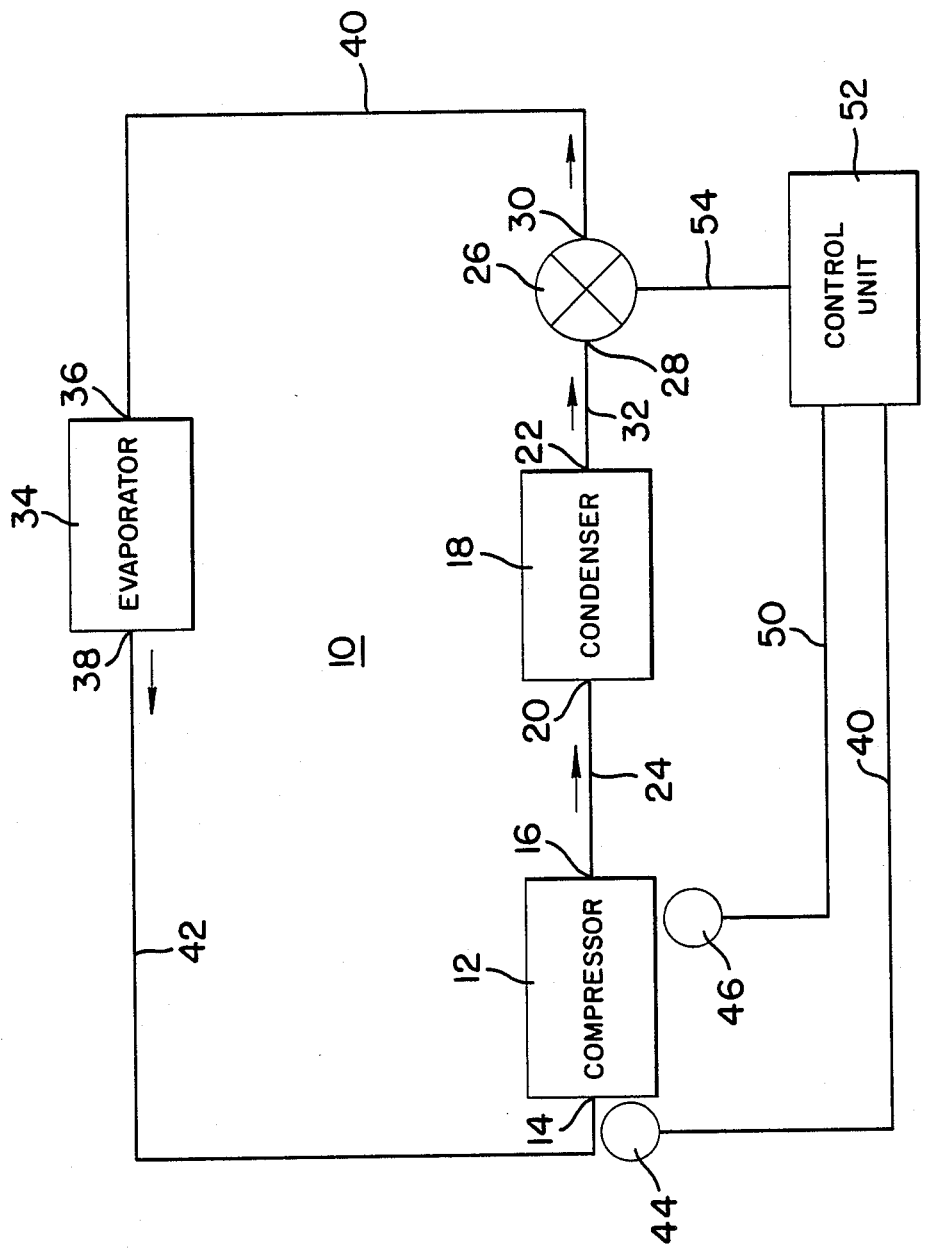
FIG. 1 is a functional block diagram of a system for refrigeration in accordance with the invention.

Referring to FIG. 1, refrigeration system 10 includes compressor 12 having inlet 14 and outlet 16. Condenser 18 has inlet 20 and outlet 22 and is connected to compressor 12 by conduit or line 24. Expansion valve 26 has inlet 28 and outlet 30 and is connected to condenser 18 by conduit 32.

Evaporator 34 has inlet 36 and outlet 38 and is connected to expansion valve 26 by line 40 and to compressor inlet 14 by line 42.

Pressure sensor 44 is shown adjacent line 42 in FIG. 1 for sensing the pressure of refrigerant in line 42 and generates an output signal indicative of such pressure on line 48. Temperature sensor 46 is shown adjacent compressor 12 in FIG. 1 for sensing the temperature of oil in the oil sump of compressor 12 and generates an output signal indicative of such temperature on line 50. Lines 48 and 50 serve as inputs to control unit 52, whose output signal on line 54 serves to control expansion valve 26.

The functioning of various elements of system 10, except for certain departures noted below, corresponds with those of the known systems above discussed. Thus, compressor 12 admits at its inlet refrigerant issuing from evaporator 34 in part in saturated vapor state, i.e., vapor at boiling temperature corresponding to evaporation pressure. As is discussed below, however, such compressor input refrigerant herein contains refrigerant in other part intended and desired liquid state. Compressor 12 compresses admitted refrigerant to higher pressure and issues high pressure refrigerant vapor at superheated condition, i.e., in state having temperature higher than the refrigerant boiling temperature at that pressure.

Such superheated refrigerant vapor is conducted from compressor 12 to condenser 18, which may be of type in which a cooling medium, such as water, is passed through a coil exposed to the incoming vapor, removing latent heat from the refrigerant and issuing saturated liquid refrigerant, i.e., refrigerant in liquid state at boiling temperature corresponsing to condensing pressure.

Refrigerant thus issuing from condenser 18 is conducted through expansion valve 26, which may be of any generally known configuration responsive to a control signal input to accordingly set the level of refrigerant flow therethrough. The valve thus effects a controlled reduction in the pressure and hence temperature of the refrigerant. A flashing into vapor of a portion of the liquid refrigerant occurs, resulting in issuance from the valve of a low temperature liquid refrigerant with a small vapor fraction.

The refrigerant, in state issuing from the expansion valve 26 is conducted to evaporator 34, wherein the refrigerant is evaporated by heat transferred thereto by the ambient environment to be cooled. Evaporator 34 issues refrigerant in part in saturated vapor state, i.e., refrigerant vapor at boiling temperature corresponding to the evaporation temperature. However, in accordance with the invention, valve 26 is operated at a refrigerant flow level such that evaporator 34 issues refrigerant in other part in liquid state. The evaporator output is conducted to the compressor inlet for continuous cycling.

Turning to FIG. 2, control unit 52 will be seen to include comparator 56, which is an electrical circuit adapted to compare differentially two input signals thereto and then to compare such difference with a preset difference desired and provide an output corresponding to the latter comparison. A lower input to comparator 52 is provided directly by line 50, i.e., a signal indicative of the oil sump temperature and furnished by sensor 46. An upper input to comparator 56 is furnished by translator 58 on line 60, the input to the translator being furnished on line 48 from pressure sensor 44, i.e., a signal indicative of the refrigerant pressure in the vicinity of inlet 14 of compressor 12. Translator 58 converts such measured pressure to saturated refrigerant temperature and may comprise a microprocessor chip or the like suitably programmed to compute such temperature from the input pressure indication. In this connection, reference is made to a publication of du Pont de Nemours and Company, copyright dated 1964 and entitled "T 22 Thermodynamic Properties of Freon 22 Refrigerant". At page 4 of this publication, equations are set forth for the translation under discussion. At pages 6-12 of the publication, there is presented Table 1, entitled "Freon 22 Saturation Properties-Temperature Table". As an alternative to the foregoing dedicated chip, one can implement the translation under discussion by use of a "look-up table" in random access memory with the information set forth in such table of the publication. Other manufacturers of refrigerant provide like information to their customers.

In accordance with the invention, the compressor oil sump temperature, and consequently the oil temperature, is maintained at a temperature significantly above the saturated temperature of the refrigerant coming into contact with the oil. By way of example, shown in FIG. 5 and discussed below, one may predetermine a target temperature differential for this purpose, such as fifty degrees F., and set such level into comparator 56 by adjustment of potentiometer P (FIG. 2). Comparator 56 will accordingly obtain the difference between the temperature signals furnished on lines 50 and 60 and compare such difference with the predetermined differential desired. Where this comparison indicates that the existing measured temperature difference is below the target differential from potentiometer P and thus should be increased to avoid oil dilution, output line 54 will be set correspondingly to decrease refrigerant flow. Conversely, where the comparison indicates that the existing measured temperature difference is above the target differential, and thus can be decreased, output line 54 will be set correspondingly to increase refrigerant flow.

Turning to FIG. 3, compressor shell casing 62 is shown with oil 64 in the cavity sump thereof. Two options are shown for realization of sensor 46, either one of which may be used in practicing the invention. In one option, sensor 46a is placed in heat exchange relation with the exterior surface 66 of casing 62, the interior surface of the casing being in heat exchange relation with oil 64 therein. The sensor output signal is furnished on line 50a. In the other option, sensor 46b is disposed interiorly of the compressor shell casing in heat exchange relation with oil 64 and furnishes its output signal on line 50b.

In FIG. 4 is shown a placement for sensor 44. Conduit 42 serves the inlet 14 of compressor 12 (FIG. 1) and sensor 44 may be supported as shown, either in conduit 42, or adjacent the end of such conduit within compressor 12.

Figure 5:
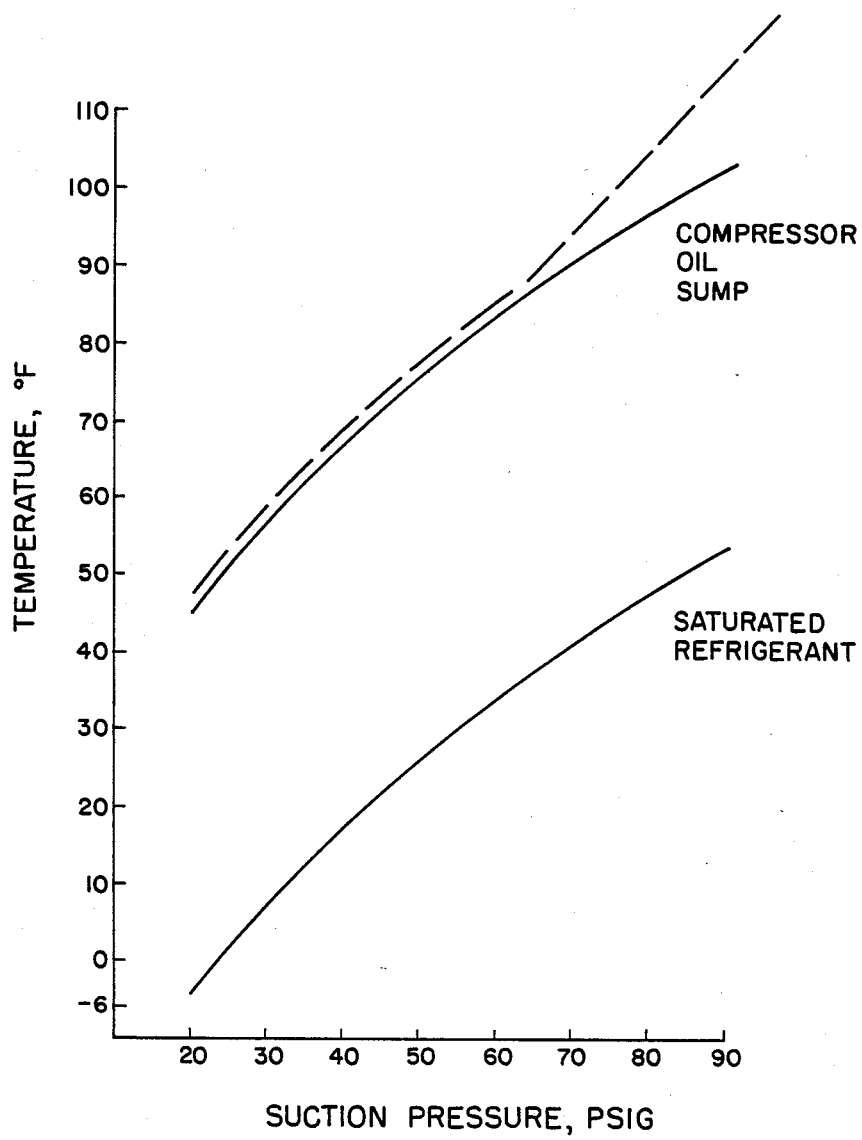
FIG. 5 are graphical showings of performance achieved in accordance with the invention.

Turning now to FIG. 5, same shows a plot of temperature in degrees F. against compressor suction pressure in psig. The upper solid line and broken line curves are of the compressor oil sump and the lower curve is of the saturated refrigerant at the compressor inlet. As is seen by the solid line compressor oil sump curve, a constant fifty degree temperature differential is maintained by the invention between the oil sump and refrigerant throughout the range of variation of suction pressure. Considering the broken line compressor oil sump curve, same does not exhibit a constant temperature differential but shows a deviation in its predetermined relationship from constant temperature relationship, as may be desired in some instances.

Figure 6:
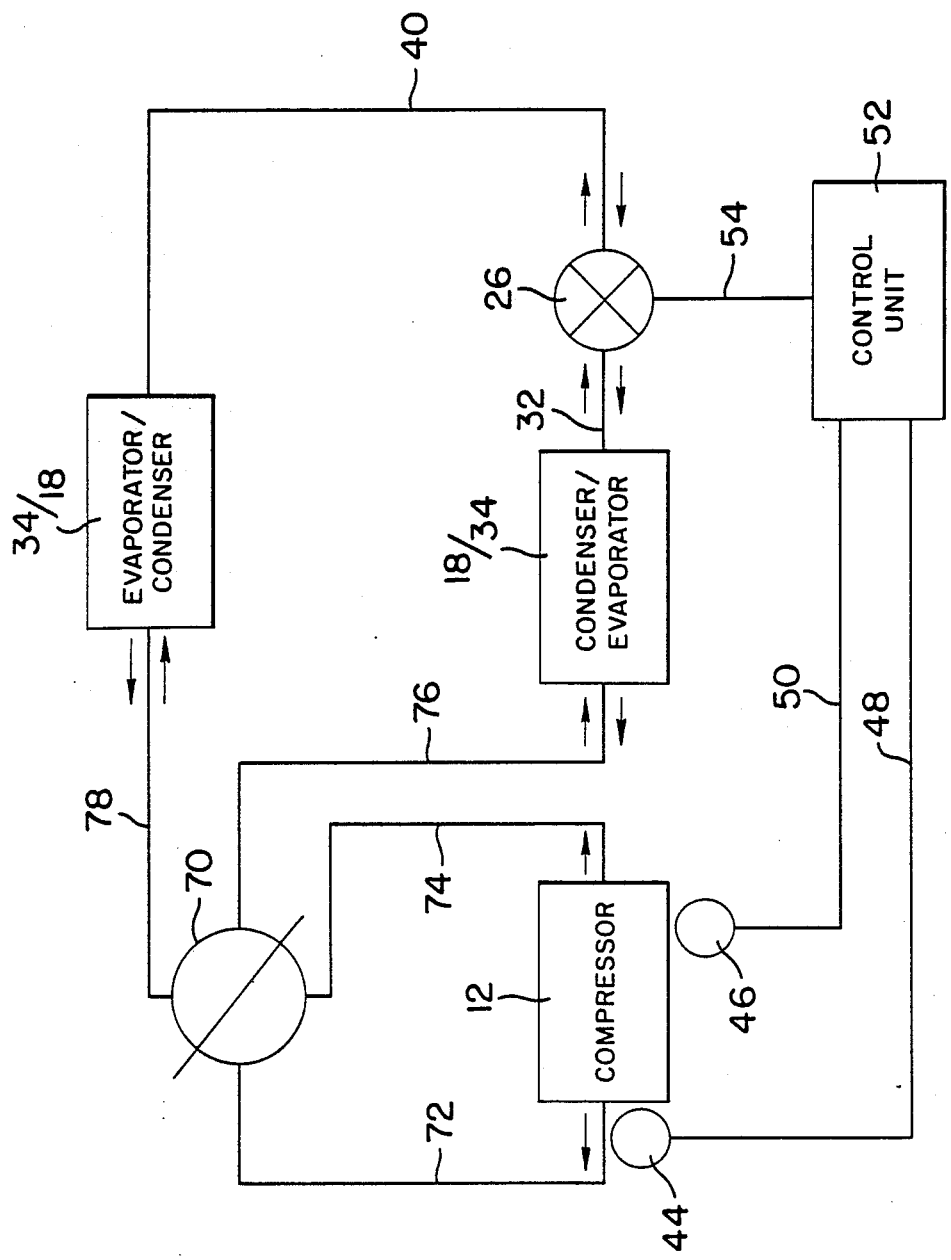
FIG. 6 is a functional block diagram of a system for refrigeration or heating in accordance with the invention.

In FIG. 6 is shown a combined refrigeration and heat pump version of a system in accordance with the invention. Reference numerals are carried over from FIG. 1 for corresponding components. By the legend "Evaporator/Condenser" in the box numbered 34/18 is meant that such box would be an evaporator if flow direction is leftwardly, as in the FIG. 1 system, i.e., a refrigeration system. Conversely, with flow in the rightward direction, such box would be a condenser, i.e., a heating system. The same applies in the case of the legend "Condenser/Evaporator" in the box numbered 18/34. For flow direction reversal, and change in mode of operation, there is introduced in this system of FIG. 6 is a flow reversing valve 70, to which is connected compressor conduit 72, compressor conduit 74, condenser conduit 76 and evaporator conduit 78. While FIG. 6 shows a heat pump which employs a single expansion device, other heat pump designs in accordance with the invention may include two expansion devices, one at each coil. The expansion device feeding the coil in which evaporation is taking place is controlled and the other expansion device is bypassed or held open. In this instance, the devices would likely be electronic, sharing the same control unit and sensors.

Either system version, heat pump or refrigeration, will be seen to give rise to an environment temperature control system comprising: a compressor having an inlet, an oil sump, and an outlet; a condensor having an outlet and an inlet; an expansion valve operable for controlling refrigerant flow in the system and having an outlet and an inlet; an evaporator having an inlet and an outlet; a conduit arrangement for connection of the compressor inlet to the evaporator outlet, for connection of the expansion valve outlet to the evaporator inlet, for connection of the expansion valve inlet to the condenser outlet, and for connection of the condenser inlet to the compressor outlet; and a control unit for operating the expansion valve to maintain a predetermined relationship between the temperature of oil in the oil sump and the saturated temperature of the refrigerant in the vicinity of the compressor inlet.

Various changes in configuration and components and modifications in practice may be introduced to the foregoing without departing from the invention. Thus, the particularly shown and discussed preferred embodiments are intended in an illustrative and not in a limiting sense. The true spirit and scope of the invention is set forth in the following claims.

I claim:

1. A refrigeration system comprising:
   (a) a compressor having an inlet, an oil sump, and an outlet;
   (b) a condenser having an outlet, and an inlet connected to said compressor outlet;
   (c) an expansion valve operable for controlling refrigerant flow in said system and having an outlet, and an inlet connected to said condenser outlet;
   (d) an evaporator having an inlet connected to said expansion valve outlet and an outlet connected to said compressor inlet; and
   (e) control means for operating said expansion valve to maintain a predetermined relationship between the temperature of oil in said oil sump and the saturated temperature of refrigerant in the vicinity of said compressor inlet, said predetermined relationship effecting a temperature differential providing that solubility of said refrigerant entering said compressor with said oil in said oil sump is less than would occur in the absence of such maintenance of said predetermined relationship.

2. The invention claimed in claim 1 wherein said control means comprises first sensor means for generating an output signal indicative of the temperature of said oil in said oil sump.

3. The invention claimed in claim 1 wherein said control means comprises sensor means for generating an output signal indicative of the pressure of refrigerant in the vicinity of said compressor inlet.

4. The invention claimed in claim 2 wherein said control means comprises second sensor means for generating an output signal indicative of the pressure of refrigerant in the vicinity of said compressor inlet.

5. The invention claimed in claim 4 wherein said control means further includes translator means for receiving said second sensor means output signal and generating therefrom an output signal indicative of the saturated temperature of said refrigerant in the vicinity of said compressor inlet.

6. The invention claimed in claim 5 wherein said control means further includes comparator means for receiving said output signals of said first sensor means and said translator means, for determining the temperature differential between the indications therein, and for comparing same with said predetermined relationship for operating said expansion valve.

7. The invention claimed in claim 1 wherein said compressor includes a shell casing defining said oil sump, said casing having exterior surface and interior surface in heat exchange relationship with said oil in said oil sump, said control means including sensor means in heat exchange relationship with said casing exterior surface for generating an output signal for use in such maintenance of such predetermined relationship.

8. The invention claimed in claim 1 wherein said compressor includes a shell casing defining said oil sump, said control means including sensor means disposed in said oil sump and in heat exchange relationship with said oil in said oil sump for use in such maintenance of such predetermined relationship.

9. The invention claimed in claim 1 wherein a conduit extends between said evaporator outlet and said compressor inlet for such connection thereof, said control means including sensor means disposed in said conduit for sensing the pressure of refrigerant in said conduit and generating an output signal for use in such maintenance of such predetermined relationship.

10. The invention claimed in claim 1 wherein a conduit extends between said evaporator outlet and said compressor inlet for such connection thereof, said control means including sensor means disposed in said compressor in registry with said conduit for sensing the pressure of refrigerant and generating an output signal for use in such maintenance of such predetermined relationship.

11. The invention claimed in claim 1 wherein a conduit extends between said evaporator outlet and said compressor inlet for such connection thereof and wherein said compressor includes a shell casing defining said oil sump, said casing having exterior surface, and interior surface in heat exchange relationship with said oil in said oil sump, said control means including first sensor means in heat exchange relationship with said casing exterior surface for generating an output signal for use in such maintenance of such predetermined relationship and second sensor means disposed in said conduit for sensing the pressure of refrigerant in said conduit and generating an output signal for use in such maintenance of such predetermined relationship.

12. The invention claimed in claim 1 wherein a conduit extends between said evaporator outlet and said compressor inlet for such connection thereof and wherein said compressor includes a shell casing defining said oil sump, said casing having exterior surface and interior surface in heat exchange relationship with said oil in said oil sump, said control means including sensor means in heat exchange relationship with said casing exterior surface for generating an output signal for use in such maintenance of such predetermined relationship and second sensor means disposed in said compressor in registry with said conduit for sensing the pressure of refrigerant and generating an output signal for use in such maintenance of such predetermined relationship.

13. The invention claimed in claim 1 wherein said compressor includes a shell casing defining said oil sump, said control means including first sensor means disposed in said oil sump and in heat exchange relationship with said oil in said oil sump for use in such maintenance of such predetermined relationship and wherein a conduit extends between said evaporator outlet and said compressor inlet for such connection thereof, said control means further including second sensor means disposed in said conduit for sensing the pressure of refrigerant in said conduit and generating an output signal for use in such maintenance of such predetermined relationship.

14. The invention claimed in claim 1 wherein said compressor includes a shell casing definig said oil sump, said control means including first sensor means disposed in said oil sump and in heat exchange relationship with said oil in said oil sump for use in such maintenance of such predetermined relationship and wherein a conduit extends between said evaporator outlet and said compressor inlet for such connection thereof, said control means including second sensor means disposed in said compressor in registry with said conduit for sensing the pressure of refrigerant and generating an output signal for use in such maintenance of such predetermined relationship.

15. An environment temperature control system comprising:
(a) a compressor having an inlet, an oil sump, and an outlet;
(b) a condenser having an outlet and an inlet;
(c) an expansion valve operable for controlling refrigerant flow in said system and having an outlet and an inlet;
(d) an evaporator having an inlet and an outlet;
(e) conduit means for connection of said compressor inlet to said evaporator outlet, for connection of said expansion valve outlet to said evaporator inlet, for connection of said expansion valve inlet to said condenser outlet, and for connection of said condenser inlet to said compressor outlet; and
(f) control means for operating said expansion valve to maintain a predetermined relationship between the temperature of oil in said oil sump and the saturated temperature of said refrigerant in the vicinity of said compressor inlet, said predetermined relationship effecting a temperature differential providing that solubility of said refrigerant entering said compressor with said oil in said oil sump is less than would occur in the absence of such maintenance of said predetermined relationship.

16. A method for effecting mechanical compression type refrigeration comprising the steps of:
(a) providing a refrigerant;
(b) compressing said refrigerant by an oil sump compression unit to provide a superheated refrigerant vapor therefrom;
(c) removing latent heat from said superheated refrigerant vapor to provide a liquid state thereof;
(d) conducting said refrigerant in said liquid state to an expansion valve and issuing therefrom refrigerant in liquid state with a vapor fraction;
(e) exposing said refrigerant in such liquid state with a vapor fraction to an environment to be refrigerated, thereby evaporating said refrigerant only in part and retaining some refrigerant in liquid part;
(f) conducting said refrigerant with such liquid part to said compression unit; and
(g) operating said expansion valve in manner to maintain a predetermined relationship between said refrigerant and the oil in the oil sump of said compression unit, said predetermined relationship being preselected to effect a temperature differential providing that solubility of said refrigerant entering said compression unit with said oil in said oil sump is less than would occur in the absence of such maintenance of said predetermined relationship.

17. The invention claimed in claim 16 wherein said step (g) is practiced by obtaining the temperature of said oil in said oil sump, by obtaining the saturated temperature of said refrigerant in the vicinity of the inlet to said compression unit, by obtaining the difference between such oil temperature and the saturated temperature of said refrigerant and by comparing such difference with said predetermined relationship.

* * * * *